H. S. STOLL.
GAME.
APPLICATION FILED OCT. 2, 1918.

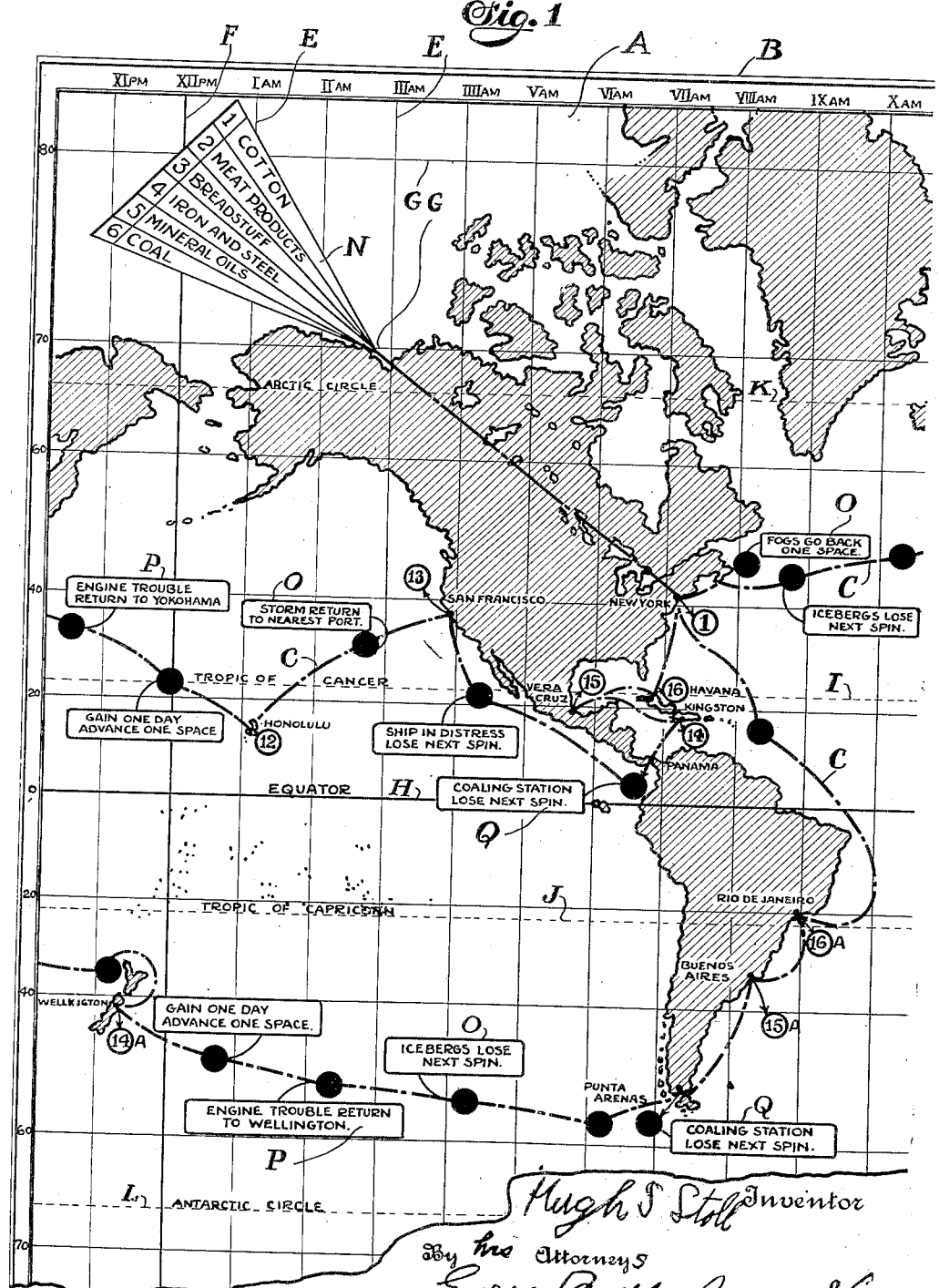

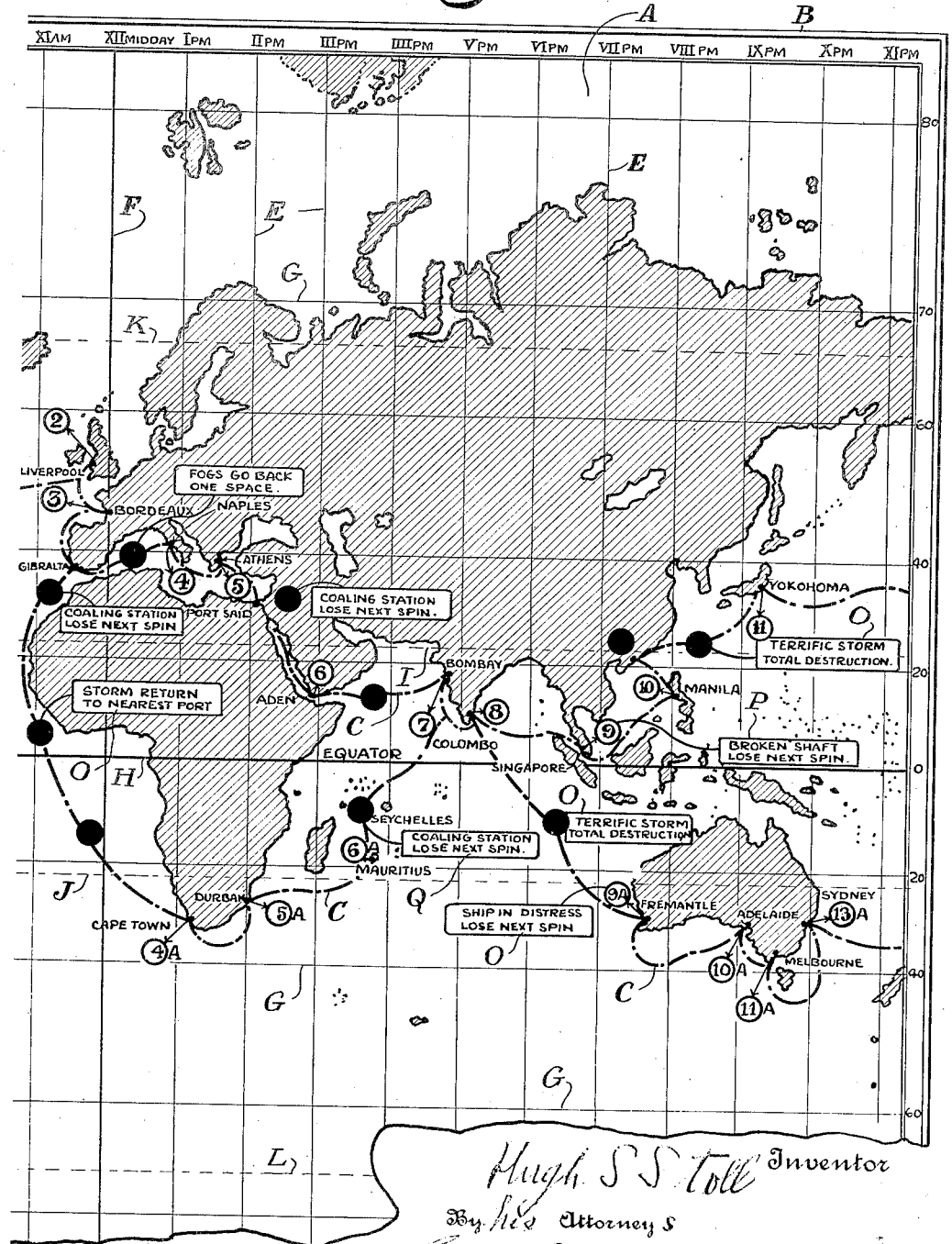

1,329,812.

Patented Feb. 3, 1920.

Fig. 2

PORTS OF THE WORLD AND CHIEF EXPORTS.

| No. | CITY | COUNTRY | CHIEF EXPORTS |
|---|---|---|---|
| 1 | NEW YORK | U. S. A. | COTTON, MEAT, DAIRY PRODUCT, IRON, STEEL, MINERAL OILS, AND COAL. |
| 2 | LIVERPOOL | ENGLAND | COTTON GOODS. |
| 3 | BORDEAUX | FRANCE | WINES, SILK GOODS. |
| 4 | GIBRALTAR | BRITISH | COALING STATION. |
| 4A | NAPLES | ITALY | RAW SILKS. |
| 5 | CAPE TOWN | BRITISH U.S. AFRICA | DIAMONDS. |
| 5A | ATHENS | B | CURRANTS. |
| 6 | DURBAN | BRITISH U.S. AFRICA | GOLD. |
| 6A | PORT SAID | BRITISH EGYPT | COALING STATION. |
| 7 | ADEN | BRITISH | DATES. |
| 6A | MAURITIUS | BRITISH | SUGAR. |
| 7 | SEYCHELLES | BRITISH | COALING STATION. |
| 8 | BOMBAY | BRITISH INDIA | COTTON, JUTE. |
| 8A | COLOMBO | BRITISH CEYLON | TEA. |
| 9 | SINGAPORE | BR. STRTS. SETT. | RICE. |
| 9A | FREMANTLE | AUSTRALIA | WOOL. |
| 10 | MANILA | U. S. P. I. | HEMP. |
| 10A | ADELAIDE | AUSTRALIA | WOOL. |
| 11 | YOKOHAMA | JAPAN | RAW SILK. |
| 11A | MELBOURNE | AUSTRALIA | WOOL. |
| 12 | HONOLULU | U.S. HAWAII IS. | SUGAR. |
| 12A | HOBART | BR. TASMANIA | TIN, COPPER. |
| 13 | SAN FRANCISCO | U. S. A | FRUITS. |
| 13A | SYDNEY | AUSTRALIA | WHEAT, WOOL. |
| 14 | PANAMA | U.S. CANAL ZONE | COALING STATION. |
| 14A | KINGSTON | BR. JAMAICA | COCOA. |
| | WELLINGTON | NEW ZEALAND | WOOL. |
| 15 | PUNTA ARENAS | CHILE | COALING STATION. |
| 15A | VERA CRUZ | MEXICO | SILVER, CRUDE OIL. |
| 16 | BUENOS AIRES | ARGENTINA | ANIMAL PRODUCTS. |
| 16A | HAVANA | CUBA | SUGAR, TOBACCO |
| | RIO DE JANEIRO | BRAZIL | COFFEE |

Fig. 3

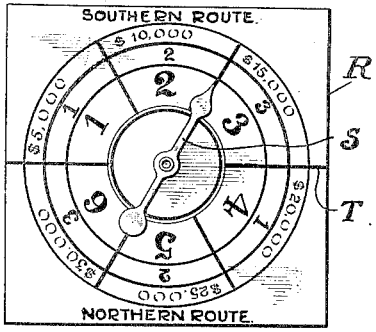

Fig. 4

Fig. 5

Hugh S. Stoll Inventor
By his Attorneys
Emery Booth, Janney & Varney

UNITED STATES PATENT OFFICE.

HUGH S. STOLL, OF NEW YORK, N. Y., ASSIGNOR TO McLOUGHLIN BROTHERS, INC., OF NEW YORK, N. Y., A CORPORATION OF NEW YORK.

GAME.

1,329,812.   Specification of Letters Patent.   Patented Feb. 3, 1920.

Application filed October 2, 1918. Serial No. 256,601.

*To all whom it may concern:*

Be it known that I, HUGH S. STOLL, a citizen of the United States, and a resident of the city, county, and State of New York, have invented an Improvement in Games, of which the following is a specification.

My invention relates to game boards. It is an object of the present invention to provide a game board of novel form, which shall be highly entertaining and shall at the same time possess considerable educational value.

By way of example I have shown a preferred embodiment of my invention in the accompanying drawings wherein:

Figures 1 and 1ª show a plan view of such embodiment;

Fig. 2 is a plan view of a chart that may accompany the game board;

Fig. 3 is a plan view of an indicator that may be employed with the game board;

Figs. 4 and 5 are elevations of two forms of indicating devices that may be employed with the board of my invention.

In the form herein shown, the game board comprises a map portion A, which may be of varying extent and character, either a map of land or of water-covered portions of the earth, or preferably, in the present instance, of both land and water. The map portion A is supported on any suitable board B. In the present instance the map A is a "mercator" projection of the surface of the globe.

On the map portion A are indicated one or more courses C, C, for travel or transportation. Where, as in the present case, the courses marked are water courses over the well recognized lanes of travel on the seas, the indicating devices D, which are used to designate each player's particular position along his particular course, preferably comprise small representations of merchant steamers. For travel or transportation by land indicating devices appropriate to the character of such travel and transportation should be employed.

The map portion A is preferably provided with the meridian or longitude lines E, E, including the "conventional division line for time," indicated at F. The map portion A is also provided with the latitude lines G, G, including the Equator H, the Tropics of Cancer and Capricorn, I and J, respectively, and the Arctic and Antarctic Circles, K and L, respectively.

By way of example, the starting point of the game may be chosen at New York, which is designated by the reference character 1. The location of the various points reached by following the course or courses marked on the map portion A may be readily ascertained by referring to the chart M which gives the reference character marking each point on the course or courses on the map, the country in which each such point is located, and the chief exports from such point.

Associated with the starting point 1, here indicating the port of New York, is a diagram N which indicates a plurality of, herein shown as six, types of cargoes or commodities which may be taken from the starting point 1.

Along each course designated on the map are indicated hazards of travel O appropriate to the course, such as fogs adjacent that part of the map which designates Newfoundland; icebergs in the higher latitudes; storms in the tropics; and other accidents or mishaps due to natural causes, which are liable to occur with the particular mode of transportation adopted.

There are also indicated, as at P, along each course non-natural hazards peculiar to the instrumentality used for travel or transportation, such as engine trouble, or a broken shaft, in the case where a steamer is used for travel or transportation. Further indications, as at Q, indicate ordinary incidents of travel or transportation, such as time necessary for coaling, unloading, time lost due to difficulty in getting clearance from a desired port, etc., the designation of which on the game board makes the game simulate actual conditions of travel or transportation quite closely, and thereby enhances the educational value of such a game.

For use with the game board I provide an indicator R having a freely rotatable member, such as the arrow, S, which is operable to selectively designate any one of the plurality of markings of each of the series of indications on the indicator R. The member or arrow S is operated in the usual manner, as by spinning the same. The series of indications on indicator R preferably comprise an inner circle of numbers, here comprising the numbers 1, 2, 3, 4, 5, and 6; a second series of numerals outside of the first-mentioned series and comprising the numbers 1, 2 and 3, each repeated twice; a series of value indications, $5,000, $10,000, $15,000, $20,000, $25,000, and $30,000; and the legends "Northern route" and "Southern route" on opposite sides of the diametrical divisional line T.

The game board above may be used for playing a game which may be appropriately called the "Merchant marine game," as follows:—

Each of the players, which may be two or more in number, selects an indicating device D, here designating a merchant steamer. Preferably the indicating devices D of the various players are differently colored so that the position of the various players may thereby be readily distinguished during the progress of the game. We shall assume that in the present case two are playing the game and that the colors of their respective indicating devices D are "red" and "white."

Each player spins the arrow S once to determine the character of cargo he is to carry, that is whether it is cotton, meat produce, breadstuff, iron and steel, mineral oils or coal. The character of the cargo is determined by the number on the innermost row of indications which is designated by the arrow S. Each player in his turn then spins again to determine the value of the cargo carried by him. Such value is determined by the arrow designating a particular one of the values indicated in the outermost circle of indications.

Each player then chooses his destination. The travel is from east to west in the order of the ascending number of reference characters indicating the various points along the course or courses marked on the map. Score should be kept of the destinations chosen and of the value and character of the cargoes carried.

Each player then in his turn spins the arrow S, and he is not permitted to enter the port of New York, indicated by reference numeral 1, until the arrow S, spun by him, designates the numeral 1 in the second circle of indications. Since there are two such numerals in the second circle of indications, each player has two chances of entering the port of New York, that is, of getting steamer space for his cargo.

After entering the port of New York, each player spins in turn except as the rules of the game and the indications on the board specify otherwise, and the figures in the inner circle of indications determine the spaces he advances or goes back. The rules of the game may, for example, specify that a player must get his exact total number of moves forward in order to arrive at his chosen destination.

For example, if each player chooses Liverpool as his first destination, this point being marked by reference character 2 on the map, it will be seen that there are four spaces between New York and Liverpool on the course as laid out on the map, and that therefore he must spin number 4 on the inner circle of numeral indications, or 3 and then 1, to reach Liverpool without running into the hazards at the first two distance indications between New York and Liverpool. These hazards are marked "Fogs—go back one space," and "Icebergs—lose next spin." If the player spins 1, instead of 3 or 4, he returns to his port of departure, while if he spins 2, he loses the next spin.

We shall assume that the first player, whom we shall designate as "red," starts with a cargo of cotton valued at $25,000, with Liverpool as his port of destination, and that he reached Liverpool in two spins of 3 and 1, respectively. He therefore puts down on his score a credit of $25,000.

We shall assume that "white" starts with a cargo of $30,000, in breadstuff and that his port of destination is also Liverpool, but that he spins 2, runs into an iceberg and loses one spin. After that he spins 2 again and reaches Liverpool with his cargo valued $30,000. He therefore credits himself on his score with $30,000.

After reaching his destination, each player selects another cargo, as determined by the chart M, which gives the chief exports of each port along the course or courses marked on the map. Each player in his turn spins once to determine the value of the new cargo, as already described for the first cargo out of New York, and selects a new destination, the travel being, as already stated, from east to west.

Each player in his turn spins again, but such spin for distance after reaching a destination determines not only the number of moves the player is entitled to advance, these moves being indicated by circles along the course or courses on the map, but also the number of days he has taken to unload his old cargo and to load a new cargo. According to the rules which have here, by way of example, been adopted in describing the specific embodiment of the invention herein shown, if a player spins any number above 3, as indicated on the inner circle of numbers, he is penalized by having deducted from his score in dollars as many thousands of dollars as he spins above 3. For example, if "red" spins 4, he moves forward four spaces on the course and $1000 is deducted from his score. If "white" spins 5, he moves forward five spaces and $2000 is deducted from his score, and so on.

The conventional divisional line for time which would normally cause a gain of one calendar day by passing across it gives the player who reaches such line an advance move of one space. The penalties indicated along each course are inflicted on each player running into the hazards designated along the course. If a player arrives at the space marked "Total destruction," he loses the value of the cargo, which value must then be deducted from his score, but he is entitled to one spin to determine the amount of insurance he receives for the cargo, which amount is added to his score. He then returns to New York and starts again with a new ship, and must spin again for a new cargo, for the value of the new cargo, and entrance into port, as at the start of the game.

The game is concluded when one player completes the course and returns to his original port of departure with a cargo, but the winner is the player who has earned the largest amount of cargo value delivered. It will therefore be noted that this form of the game resembles the actual business of a tramp steamer which goes from port to port, loading at one port, and unloading and then loading again at the next port with a new cargo for still another port, and so on. The markers D are advanced during the progress of the game to indicate each player's position on the board. At Gibralter and Colombo each player elects whether he will proceed by the northern or southern route.

The following is an example of another form of game that may be played on the illustrative game board herein shown and described. This game may appropriately be designated as "The game of international salesman".

Each player spins to determine his entrance into the first city visited by him, here New York. This he does as in the "Merchant marine game" by spinning the arrow S until it designates one of the two numerals 1 in the second or outer circle of the numeral indications. After entering, the figures in the first circle of number indications determine the number of his moves.

When a salesman arrives at a numbered space or city, he spins to determine the amount of his sales as indicated by the outer circles of value indications on the indicator R.

If any one of the salesmen catches up with the first salesman before he reaches a particular city, the first salesman secures only business to the amount he actually spins, and the salesman who has caught up with the first salesman also secures business to the actual amount he spins. On the other hand, if any of the salesmen should make a city or numbered space not already made by the salesman preceding him or previously made by himself, he is entitled to double the amount of business indicated by the arrow S in the outermost or value row of indications on the indicator R.

Each salesman must make Gibralter and Colombo to determine the route (northern or southern) which he must follow, the route being indicated by the arrow S spun by each player designating the legend "Northern route" or "Southern route" on the indicator R. The arrow S will at the same time that it selects the route to be followed indicate also the number of moves to be made by the player, the indications in the second or outer circle of numerals being used at these two points to indicate the number of moves, rather than the indications in the first or inner circle of numerals.

The various indications along the course or courses should be followed. The conventional division line for time adds one day, that is, if a salesman spins and reaches the indication marking this line, he advances one extra space. According to the rules which may be adopted for this form of the game, if a salesman reaches the space marked "Total destruction" he is sent back one space, and remains there until all of the other players have passed him. He may then resume the game.

The game is concluded when all of the salesmen complete the trip around the world and return to the starting point, that is, New York. The winner is the salesman who has secured the largest amount of business.

It is of course to be understood that my invention is not to be limited to the specific embodiment herein shown and described by way of example merely.

What I claim is:

1. A game board comprising a map, markings on said map to indicate alternative courses and artificial hazards along said courses and appropriate to the geographical phenomena of the corresponding portions of the earth's surface, and a scoring board having markings to indicate increments of progress on each of said alternative courses and means coöperating with said markings for fortuitously designating the increments of progress on both of said courses.

2. A game board comprising a map, markings on said map to indicate alternative courses, markings along said courses to indicate natural conditions appropriate to the geographical location of the markings, progress directing markings appropriate to the natural condition markings and a scoring member having markings to indicate increments of progress on each of said alternative courses and means coöperating with said markings for fortuitously designating the increments of progress on both of said courses.

3. A game board comprising a map, markings on said map to indicate courses of transportation, markings along said courses to indicate stages of progress and designating artificial and natural hazards of transportation appropriate to the instrumentality employed therein, markings to identify the kinds of cargoes and cargo values and means having markings corresponding to the cargo identifying markings and operable to fortuitously select the character of the cargo, means to fortuitously designate the value of a cargo and means to designate increments of progress along a course.

In testimony whereof, I have signed my name to this specification this 30th day of Sept., 1918.

HUGH S. STOLL.